(12) United States Patent
Brown et al.

(10) Patent No.: US 8,261,564 B2
(45) Date of Patent: Sep. 11, 2012

(54) REFRIGERANT RECOVERY APPARATUS WITH VARIABLE VACUUM TIME AND METHOD

(75) Inventors: William Brown, Owatonna, MN (US); Gary Murray, Montpelier, OH (US)

(73) Assignee: SPX Corporation, Charlotte, NC (US)

( * ) Notice: Subject to any disclaimer, the term of this patent is extended or adjusted under 35 U.S.C. 154(b) by 850 days.

(21) Appl. No.: 11/798,102

(22) Filed: May 10, 2007

(65) Prior Publication Data

US 2008/0276634 A1    Nov. 13, 2008

(51) Int. Cl.
*F25B 45/00* (2006.01)
(52) U.S. Cl. ............. 62/149; 62/174; 62/292; 62/324.4
(58) Field of Classification Search .................. 62/149, 62/174, 292, 324.4; 417/199.1
See application file for complete search history.

(56) References Cited

U.S. PATENT DOCUMENTS

| | | | | |
|---|---|---|---|---|
| 4,172,477 | A | * | 10/1979 | Reich ............................... 141/8 |
| 4,304,102 | A | | 12/1981 | Gray ............................... 62/195 |
| 4,364,236 | A | | 12/1982 | Lower et al. .................... 62/77 |
| 4,441,330 | A | | 4/1984 | Lower et al. .................... 62/149 |
| 4,756,794 | A | * | 7/1988 | Yoder ............................ 216/62 |
| RE33,212 | E | * | 5/1990 | Lower et al. .................... 62/126 |
| 4,984,431 | A | | 1/1991 | Mount et al. ................... 62/85 |
| 5,005,369 | A | | 4/1991 | Manz ............................. 62/195 |
| 5,005,375 | A | | 4/1991 | Manz et al. .................... 62/292 |
| 5,028,212 | A | * | 7/1991 | Brophey et al. ................ 417/12 |
| 5,031,410 | A | | 7/1991 | Pizak et al. .................... 62/85 |
| 5,034,743 | A | * | 7/1991 | Deppe et al. ................... 341/116 |
| 5,063,749 | A | | 11/1991 | Manz ............................. 62/149 |
| 5,078,756 | A | | 1/1992 | Major et al. ................... 55/21 |
| 5,099,653 | A | | 3/1992 | Major et al. ................... 62/149 |
| 5,123,259 | A | | 6/1992 | Morgan, Sr. ................... 62/292 |
| 5,167,126 | A | | 12/1992 | Cartwright .................... 62/129 |
| 5,181,388 | A | | 1/1993 | Abraham ....................... 62/77 |
| 5,187,940 | A | | 2/1993 | Paxton ........................... 62/77 |
| 5,187,953 | A | | 2/1993 | Mount ........................... 62/195 |
| 5,189,882 | A | | 3/1993 | Morgan, Sr. ................... 62/77 |
| 5,209,074 | A | | 5/1993 | McConnell et al. ............ 62/85 |
| 5,226,300 | A | | 7/1993 | Christensen et al. ........... 62/77 |
| 5,317,906 | A | * | 6/1994 | Dolan et al. ................... 62/127 |

(Continued)

OTHER PUBLICATIONS

"Deterministic Modeling: Linear Optimization with Applications", 1994, pp. 1-49, http://home.ubalt.edu/ntsbarsh/opre640a/partVIII.htm.*

(Continued)

*Primary Examiner* — Cheryl J Tyler
*Assistant Examiner* — Paolo Gonzalez
(74) *Attorney, Agent, or Firm* — Baker & Hostetler LLP

(57) ABSTRACT

A recovery apparatus, system and method, including a compressor to evacuate a gas or liquid from a system during a first phase and a second phase of a recovery process, and a vacuum pump to evacuate the gas or liquid during the second phase. A memory stores one or more correlation relations to determine a predetermined second variable recovery time for the second phase to evacuate the system to a second predetermined level related to a first recovery time to evacuate the vessel or system to a first predetermined level during the first phase, and a processor to determine the second variable recovery time, based on the one or more correlation relations and the first recovery time, and selectively control the compressor and the vacuum pump to evacuate the gas or liquid from the vessel or system to the first and second predetermined levels.

28 Claims, 6 Drawing Sheets

U.S. PATENT DOCUMENTS

| | | | |
|---|---|---|---|
| 5,325,675 A | 7/1994 | Manz et al. | 62/77 |
| 5,367,886 A | 11/1994 | Manz et al. | 62/195 |
| 5,369,959 A | 12/1994 | Pfefferle et al. | 62/195 |
| 5,388,416 A | 2/1995 | Manz et al. | 62/85 |
| 5,400,613 A | 3/1995 | O'Neal | 62/195 |
| 5,412,955 A | 5/1995 | Husarik et al. | 62/85 |
| 5,425,242 A | 6/1995 | Dunne et al. | 62/85 |
| 5,487,646 A * | 1/1996 | Ushitora et al. | 417/4 |
| 5,493,869 A | 2/1996 | Shirley et al. | 62/149 |
| 5,517,825 A | 5/1996 | Manz et al. | 62/158 |
| 5,544,492 A | 8/1996 | Manz | 62/85 |
| 5,544,494 A | 8/1996 | Manz | 62/292 |
| 5,560,215 A | 10/1996 | Talarico | 62/149 |
| 5,564,907 A * | 10/1996 | Maruyama et al. | 417/252 |
| 5,582,023 A | 12/1996 | O'Neal | 62/195 |
| 5,664,424 A | 9/1997 | Olds | 62/85 |
| 5,758,506 A * | 6/1998 | Hancock et al. | 62/77 |
| 5,806,328 A * | 9/1998 | Muston et al. | 62/149 |
| 5,873,263 A | 2/1999 | Chang | 62/617 |
| 5,875,638 A * | 3/1999 | Tinsler | 62/149 |
| 6,029,472 A | 2/2000 | Galbreath, Sr. | 62/475 |
| 6,134,896 A * | 10/2000 | Brown et al. | 62/149 |
| 6,134,899 A | 10/2000 | Brown et al. | 62/195 |
| 6,185,945 B1 | 2/2001 | Pfefferle et al. | 62/149 |
| 6,256,968 B1 * | 7/2001 | Kristen | 53/512 |
| 6,314,749 B1 * | 11/2001 | Van Steenburgh, Jr. | 62/292 |
| 6,408,637 B1 | 6/2002 | Hanson et al. | 62/292 |
| 6,427,457 B1 | 8/2002 | Pfefferle et al. | 62/149 |
| 6,442,963 B1 | 9/2002 | Pfefferle et al. | 62/475 |
| 6,585,490 B1 * | 7/2003 | Gabrys et al. | 417/51 |
| 7,104,075 B2 | 9/2006 | Meeker | 62/77 |
| 2003/0123990 A1 * | 7/2003 | Yamamoto et al. | 417/44.11 |
| 2006/0010888 A1 | 1/2006 | Suharno et al. | 62/149 |
| 2006/0010898 A1 | 1/2006 | Suharno et al. | 62/292 |
| 2006/0101834 A1 | 5/2006 | Govekar et al. | 62/149 |
| 2006/0101835 A1 | 5/2006 | Meldahl et al. | 62/149 |
| 2006/0236705 A1 | 10/2006 | Govekar et al. | 62/149 |
| 2006/0272752 A1 * | 12/2006 | Chaffotte et al. | 148/626 |

OTHER PUBLICATIONS

Robinair, "*Operating Manual for Model 34788; Recovery, Recycling, Recharging Unit*", Nov. 30, 2006.

SAE International, "*Surface Vehicle Standard*", J2788, Issued Dec. 2006.

Robinair, Renew Refresh Reward, "*Making Green Has Never Been So Cool*", 34788, 2006.

* cited by examiner

US 8,261,564 B2

REFRIGERANT RECOVERY APPARATUS WITH VARIABLE VACUUM TIME AND METHOD

FIELD OF THE INVENTION

The present invention relates generally to refrigerant recovery apparatus and methods. More particularly, the present invention relates to refrigerant recovery methods and apparatus to provide enhanced recovery efficiency and a reduced service time for refrigerant collection by employing a variable vacuum time during the recovery process.

BACKGROUND OF THE INVENTION

Apparatus and systems used for air conditioning (AC) refrigerant recovery typically are required to meet a certain level of recovery efficiency. The need to provide for recovery efficiency is important to reduce emissions of refrigerant during the recovery process and to provide for accurate recharging, such as for mobile AC systems.

A SAE Surface Vehicle Standard has been issued, SAE J2788, in December of 2006. This SAE standard implements a refrigerant recovery standard for mobile AC systems to achieve a 95% refrigerant recovery efficiency in 30 minutes or less, based upon a 3 lb capacity General Motors (GM) specified system. See, Section 7.1.1 of the SAE J2788 standard.

U.S. Pat. No. 5,325,675, entitled "Refrigerant Handling System and Method With Enhanced Recovery Vacuum Capacity" provides a method wherein the refrigerant compressor can be employed alone for drawing refrigerant down to a pressure of one atmosphere (zero psig, 29.9 inches of mercury), and then the vacuum pump is then operatively connected in series with the compressor to assist the compressor in drawing a deeper inlet vacuum, such as in the range of zero to twenty inches of mercury.

Typically, the aforementioned level of refrigerant recovery efficiency has been achieved by recovering the initial refrigerant from the system to zero psig using only the compressor of the refrigerant recovery apparatus (as in conventional recovery) and then pulling for a fixed period of time of 15 minutes, for example, with a vacuum pump of the refrigerant recovery apparatus in series with the compressor.

However, refrigerant recovery systems and methods that pull to a preset vacuum level, such as pulling to 0 psig with the compressor, and then running the vacuum pump in series with the compressor for the fixed period of time, do not take into consideration variations in ambient and vehicle temperature, as well as mobile AC system configuration differences, which can effect the time required to meet efficiency levels for refrigerant recovery.

For example, where pulling to zero psig with the SAE requirement for refrigerant recovery for the fixed period of time meets the SAE requirement for refrigerant recovery efficiency on a large mobile AC system, smaller mobile AC systems and different ambient conditions can require less time than the fixed period of time to meet the SAE requirement for refrigerant recovery efficiency.

Therefore, for mobile AC systems that require less than the fixed period of time to meet the refrigerant recovery efficiency, a service time penalty can result leading to increased operating costs and reduced efficiency as to the mobile AC systems that can be serviced over a period of time.

Accordingly, it is desirable in the AC recovery area for refrigerant recovery, as well as in other gas or liquid recovery, to provide recovery apparatus, systems and methods that utilize a variable period of time, rather than the fixed period of time, for gas or liquid recovery, for drawing down or evacuating a vessel or system, such as time period to run the vacuum pump with the compressor to meet the SAE requirement for refrigerant recovery efficiency for mobile AC systems, to promote reducing operating costs and increasing efficiency as to number of units that can be serviced over a period of time.

SUMMARY OF THE INVENTION

The foregoing needs are met, to a great extent, by the present invention, wherein in various aspects an apparatus, systems and methods are provided that in some embodiments include a variable period of time, rather than the fixed period of time for drawing down or evacuating a vessel or system. The variable period of time promotes reducing operating costs and increasing efficiency as to number of units that can be serviced over a period of time, and helps to meet the SAE requirement for refrigerant recovery efficiency for mobile AC systems.

In accordance with an embodiment and aspects of the present invention, a recovery apparatus is provided including a compressor to evacuate a gas or liquid from a vessel or system during a first phase and a second phase of a recovery process, and a vacuum pump to evacuate the gas or liquid from the vessel or system during the second phase of the recovery process. A processor selectively controls the compressor and the vacuum pump to evacuate the gas or liquid from the vessel or system to a first predetermined level during the first phase of the recovery process and to a second predetermined level during the second phase of the recovery process.

The processor controls the compressor to operate to evacuate the vessel or system to the first predetermined level and determines a first recovery time to evacuate the vessel or system to the first predetermined level, determines a predetermined second variable recovery time for the second phase of the recovery process by applying in one or more correlation relations the first recovery time to evacuate the vessel or system to the first predetermined level, and controls the compressor to operate together with the vacuum pump for the predetermined second variable recovery time to evacuate the vessel or system to the second predetermined level for the second phase of the recovery process.

In accordance with another embodiment and aspects of the present invention, a mobile air conditioning (AC) recovery system is provided including a compressor to evacuate a refrigerant from a vehicle AC system during a first phase and a second phase of a refrigerant recovery process, a vacuum pump to evacuate the refrigerant from the vehicle AC system during the second phase of the refrigerant recovery process, a memory to store one or more correlation relations to determine a predetermined second variable recovery time for the second phase of the refrigerant recovery process to evacuate the refrigerant from the vehicle AC system to a second predetermined level related to a first recovery time to evacuate the refrigerant from the vehicle AC system to a first predetermined level during the first phase of the refrigerant recovery process, and a processor to selectively control the compressor and the vacuum pump to evacuate the refrigerant from the vehicle AC system to the first and second predetermined levels.

In the mobile AC system, according to aspects of the invention, the processor controls the compressor to operate to evacuate the refrigerant from the vehicle AC system to the first predetermined level and determines the first recovery time to evacuate the refrigerant from the vehicle AC system to the first predetermined level. The processor determines the predetermined second variable recovery time for the second phase of the recovery process by applying in the one or more correlation relations the first recovery time to evacuate the refrigerant from the vehicle AC system to the first predetermined level, and controls the compressor to operate together with the vacuum pump for the predetermined second variable recovery time to evacuate the refrigerant from the vehicle AC system to the second predetermined level for the second phase of the refrigerant recovery process.

In accordance with yet a further embodiment and aspects of the present invention, there is provided a recovery system, including a first means for evacuating a gas or liquid from a vessel or system during a first phase and a second phase of a recovery process, a second means for evacuating the gas or liquid from the vessel or system during the second phase of the recovery process, and a control means for selectively controlling the first means and the second means for evacuating the gas or liquid from the vessel or system to a first predetermined level during the first phase of the recovery process and to a second predetermined level during the second phase of the recovery process.

In the recovery system, the control means controls the first means for evacuating to operate to evacuate the vessel or system to the first predetermined level and determines a first recovery time to evacuate the vessel or system to the first predetermined level, determines a predetermined second variable recovery time for the second phase of the recovery process to evacuate the vessel or system to the second predetermined level by applying in one or more correlation relations the first recovery time to evacuate the vessel or system to the first predetermined level, and controls the first means for evacuating to operate together with the second means for evacuating for the predetermined second variable recovery time to evacuate the vessel or system to the second predetermined level for the second phase of the recovery process.

In accordance with yet still another embodiment and aspects of the present invention, there is provided a recovery method including evacuating gas or liquid from a vessel or system during a first phase of a recovery process to a first predetermined level, determining a first recovery time to evacuate the vessel or system to the first predetermined level during the first phase of the recovery process, determining a predetermined second variable recovery time for a second phase of the recovery process to evacuate the vessel or system to a second predetermined level by applying in one or more correlation relations the first recovery time to evacuate the vessel or system to the first predetermined level, and evacuating the gas or liquid from the vessel or system for the predetermined second variable recovery time during the second phase of the recovery process to evacuate the gas or liquid from the vessel or system to the second predetermined level.

In accordance with yet another aspect of the present invention, there are provided computer readable media having embodied thereon computer-executable instructions for execution of a gas or liquid recovery method by a processor according to aspects of the invention.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
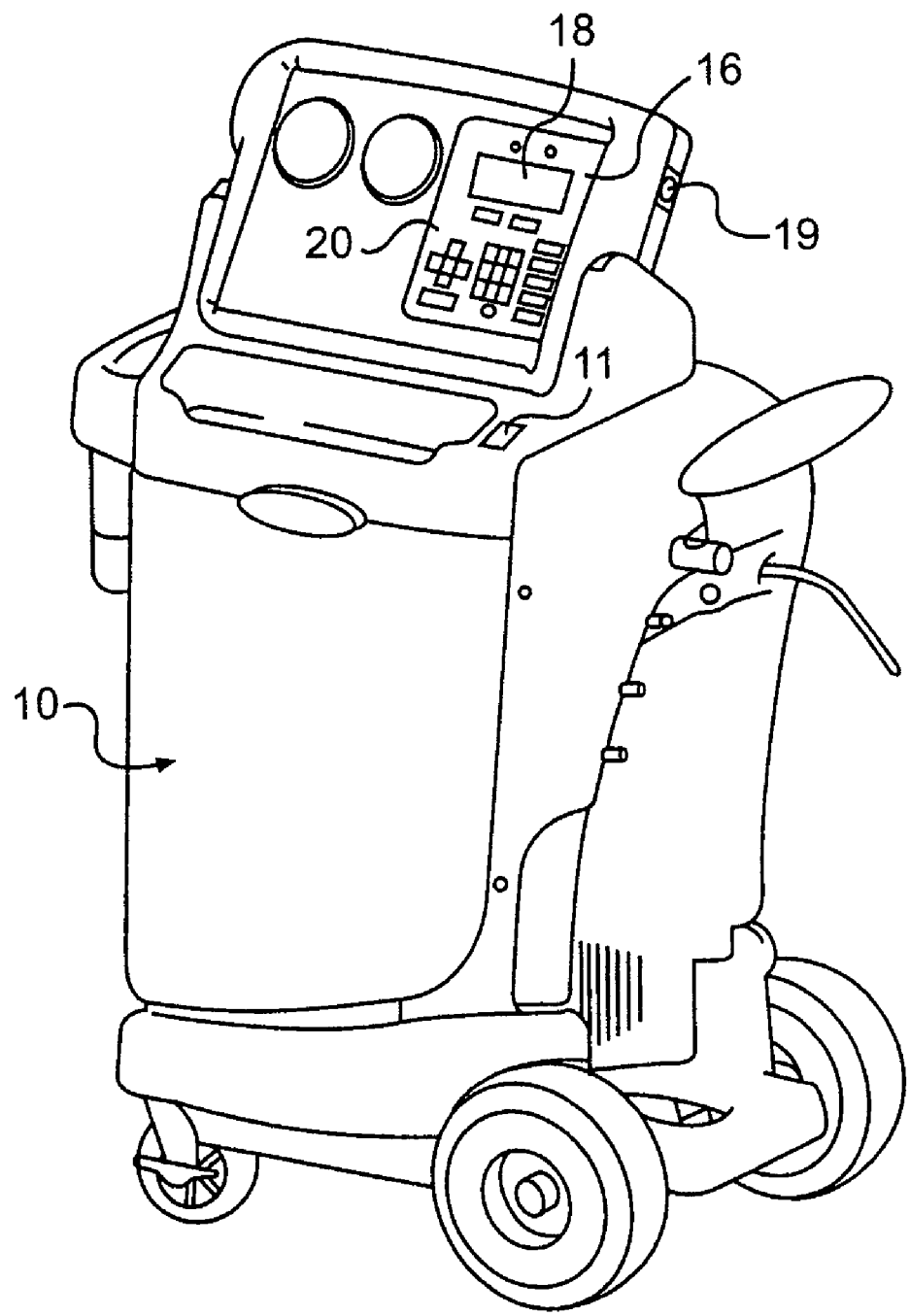
FIG. 1 is a perspective view illustrating an exemplary AC recovery unit than can implement a recovery method, apparatus and system according to embodiments and aspects of the present invention.

The invention will now be described with reference to the drawing figures, in which like reference numerals refer to like parts throughout. Various embodiments in accordance with the present invention provide a recovery apparatus, system and method that include a variable period of time during a second recovery stage, rather than a fixed period of time, for gas or liquid recovery, for drawing down or evacuating a vessel or system.

More particularly, and by way of example, the recovery apparatus, system and method that utilizes a variable period of time during a second recovery stage, rather than a fixed period of time, for gas or liquid recovery is described in relation to refrigerant recovery and to an AC recovery, recycling and recharging unit, although the present invention is not limited in this regard.

Exemplary embodiments for illustration of the present inventive recovery method, apparatus and system including a variable period of time to draw down or evacuate a vessel or system, according to aspects of the present invention are described with reference to FIGS. 1 through 7.

Figure 3:
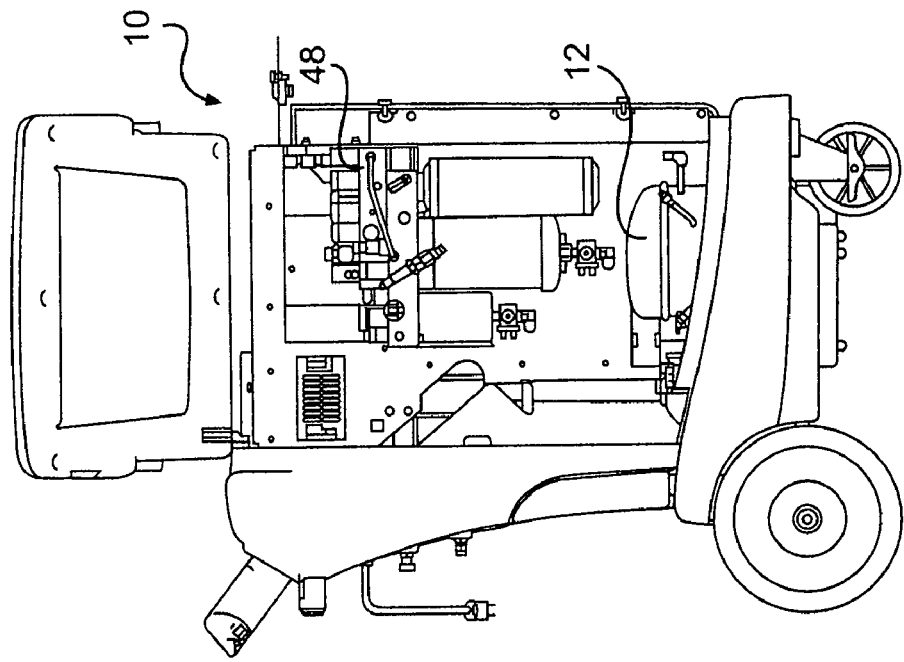
FIG. 3 is a rear, cutaway view of the AC recovery unit of FIG. 1 illustrating various components than can implement a recovery method, apparatus and system according to embodiments and aspects of the present invention.
Figure 2:
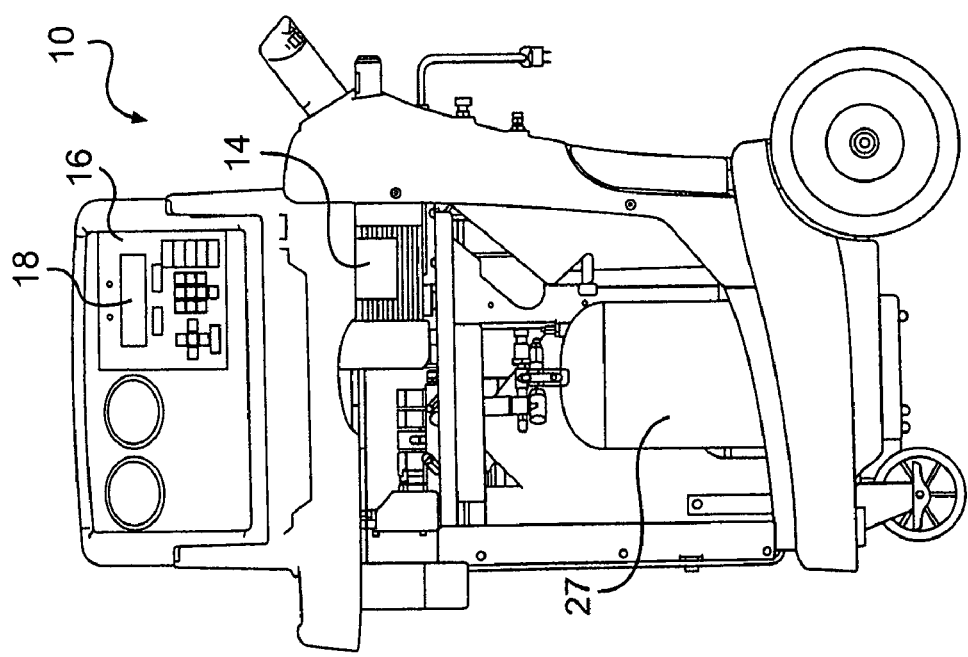
FIG. 2 is a front, cutaway view of the AC recovery unit of FIG. 1 than can implement a recovery method, apparatus and system according to embodiments and aspects of the present invention.

FIG. 1 is a perspective view illustrating an AC recovery unit 10, for example a Robinair® Model 34788 recovery, recycling, and recharging unit for the containment of R-134a refrigerant, such as used for air conditioning systems of automotive vehicles in implementing a recovery method, apparatus and system, according to aspects of the present invention. FIG. 2 is a front, cutaway view of the AC recovery unit 10 of FIG. 1 illustrating various components in implementing a recovery method, apparatus and system, according to aspects of the present invention. FIG. 3 is a rear, cutaway view of the AC recovery unit 10 of FIG. 1 illustrating various components in implementing a recovery method, apparatus and system, according to aspects of the present invention.

Figure 4:
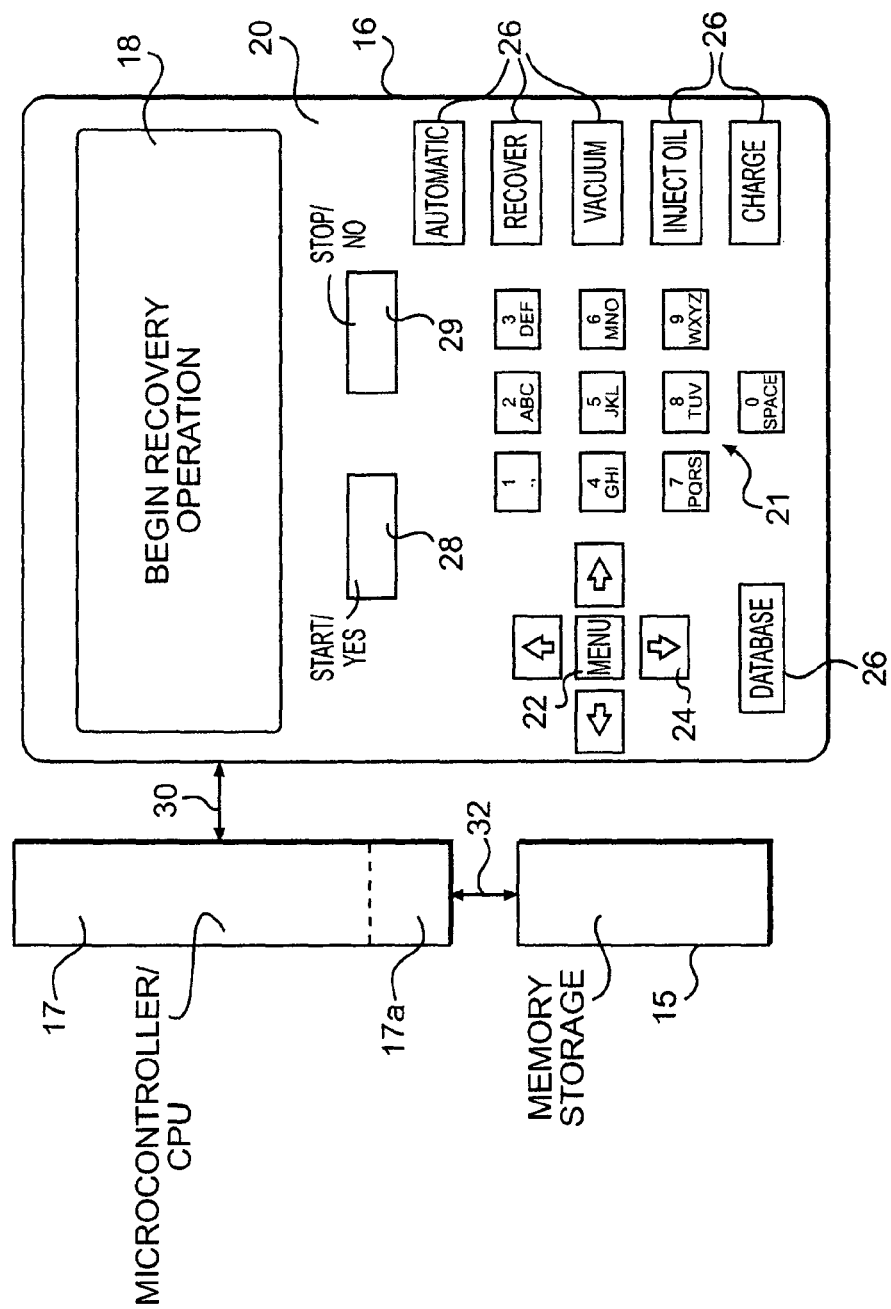
FIG. 4 is a schematic diagram of various control, processing and memory components of the AC recovery unit of FIGS. 1 through 3.
Figure 5:
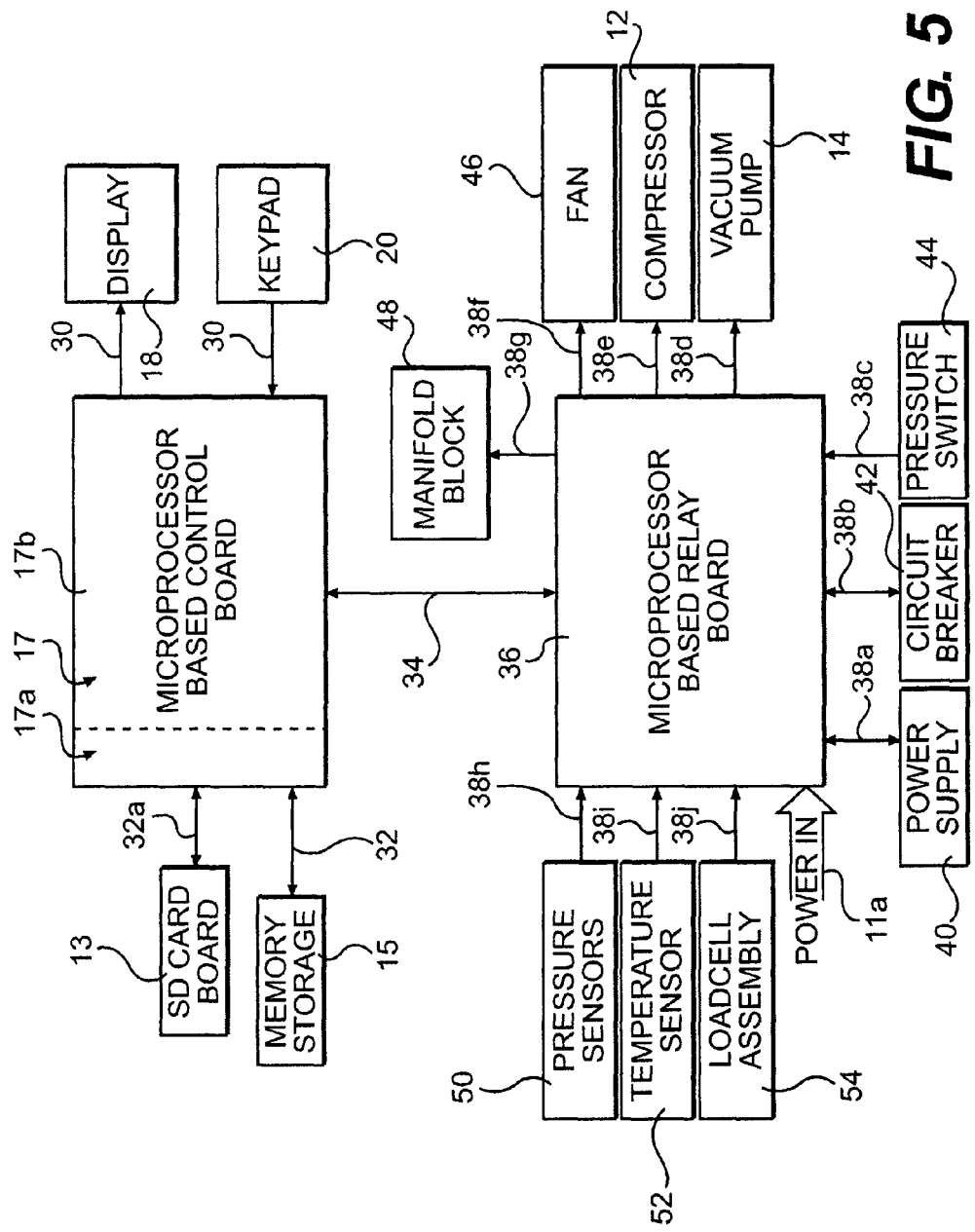
FIG. 5 is a schematic diagram of various components of the AC recovery unit of FIGS. 1 through 3.

FIG. 4 is a schematic diagram of various control, processing and memory components of the AC recovery unit of FIGS. 1 through 3 in implementing a recovery method, apparatus and system of the present invention, as well as other processes of the unit 10. FIG. 5 is a schematic diagram of various components of the AC recovery unit of FIGS. 1 through 3 in implementing a recovery method, apparatus and system of the present invention, as well as other processes of the unit 10.

Referring to FIGS. 1 through 5, AC recovery unit 10 is an example of an apparatus in implementing a recovery method, apparatus and system including a variable period of time to draw down or evacuate a vessel or system of the present invention, although the invention is not limited in this regard.

AC recovery unit 10 includes a power on/off switch 11 for enabling operation of the unit 10, as required. Further, unit 10 includes a compressor 12 to draw down or evacuate a vessel or system, such as a mobile AC system for an automobile or other vehicle during first and second phases or stages of refrigerant recovery. AC recovery unit 10 is an example of a vessel or system to which the present invention is applicable, although the present invention is not limited in this regard. The present invention can also apply to various gaseous or liquid type mediums, for example. Also, the unit 10 includes a vacuum pump 14 to additionally draw down or evacuate a vessel or system, such as a mobile AC system for an automobile or other vehicle during the second phase or stage of refrigerant recovery, as an example of a vessel or system to which the present invention is applicable.

The AC recovery unit 10 includes a control panel 16 for operation of the unit 10. The control panel 16 includes a display 18, such as a digital display, to provide a visual interface for viewing and monitoring by an operator various functions and operations of the unit 10, including a refrigerant recovery operation, according to aspects of the invention.

The display 18 can be any type display, including for example but not limited to, a liquid crystal display (LCD), organic light emitting diode (OLED), field emission display (FED), electroluminescent display (ELD), etc. In addition, the LCD, for example, can be touch screen that both displays and performs the additional task of interfacing between the user and the AC recovery unit 10.

Further, the control panel 16 of the unit 10 includes a database input, interface or port 19, such as an expansion slot or a port. The database input or port 19 receives, communicates or supplies information, data, processes or programmable operations, or other information, to a memory storage unit 15 for communication by or through a processor 17 of the unit 10, to be further discussed, for performing one or more functions and operations of the unit 10. Such information communicated or supplied can include, for example AC refrigerant charge capacity for various vehicles, vessels or processes, rates of recovered refrigerant, gas or liquid weight change, ambient temperature, or the refrigerant, liquid, or gas capacity of the vessels or systems to be drawn down or evacuated, according to aspects of the invention.

The database input or interface 19 allows the unit 10 to connect to an external device, such as, but not limited to, a computing device, an external communication device (such as a modem), a network, etc. through a wired or wireless connection, such as BLUETOOTH, an infrared device, a wireless fidelity (WiFi, e.g. 802.11), etc. Database input or interface 19 can also include connections such as a USB (universal serial bus), FIREWIRE (Institute of Electrical and Electronics Engineers (IEEE) 1394), modem, RS232, RS48J, and other connections to communicate with external devices, such as a hard drive, USB drive, CD player, DVD player, or other computer readable medium devices.

The control panel 16 also includes a keypad 20, such as including an alpha-numeric keypad 21, for entering information or selecting various functions or performing various operations of the unit 10, such as a refrigerant, liquid or gas recovery operation, according to aspects of the invention. The keypad 20 of control panel 16 includes a menu selection button 22 and associated navigation keys 24 to select and perform various functions and operations of the unit 10, such as a refrigerant, liquid or gas recovery operation, according to aspects of the invention.

The keypad 20 of the control panel 16 also includes a plurality of keypad function buttons 26 to perform various functions of the unit 10, such as performing a refrigerant, liquid or gas recovery operation, according to aspects of the invention, as well as an automatic recover, leak test and charge sequence, a recovery sequence, a vacuum sequence, an inject oil sequence, an AC charge sequence, or accessing a database, or other suitable function, for example. Also, the illustrated key pad 20 has a start/yes button 28 and a stop/no button 29 for commencing, pausing or terminating a function, or to respond to an inquiry, such as can be utilized in a recovery method, apparatus and system including a variable period of time to draw down or evacuate a vessel or system of the present invention.

As illustrated in FIG. 4, the control panel 16 communicates with the processor 17, such as through a line or bus 30, for performing the functions of the unit 10, including those related to performing a liquid or gas, such as a refrigerant, recovery operation, according to aspects of the invention. The processor 17 can be any suitable device, such as an application specific integrated circuit (ASIC), a central processing unit (CPU), a microprocessor, microcontroller, a field programmable gate array (FPGA), or complex programmable logic device (CPLD), or other suitable processor or processing device, with associated memory or programming, for controlling or performing the operations of the unit 10 and the processes, such as a refrigerant, recovery operation, according to aspects of the invention.

The memory storage unit 15 communicates, receives or stores data, software and programs for operation of the unit 10, including those data, software or programs related to performing a liquid or gas, such as a refrigerant, recovery operation, according to aspects of the invention. The memory storage unit 15, such as in a non-volatile memory, can provide, for example, storage for boot code, self-diagnostics, various drivers and software to run the unit 10. The memory storage unit 15 can communicate software, programs or data with the processor 17, such as through a line or bus 32. The memory storage unit 15 and the processor 17 (as indicated by the numeral 17a) can include an internal non-volatile memory (NVM), a read only memory (ROM), a random access memory (RAM), a dynamic random access memory (DRAM), a programmable read only memory (PROM), an erasable programmable read-only memory (EEPROM), a flash ROM, or other similar memory.

The memory storage unit 15 can also include, for the unit 10 or for other suitable systems or apparatus to which the present invention can be applied, a hard drive or a card reader, such as for, but not limited to, a compact flash card, floppy disk, memory stick, secure digital, flash memory or other type of memory. The memory card reader, for example, can be a reader that reads more than one of the aforementioned memory such as a combination memory card reader. Additionally, the card reader or hard drive can also, for example, read any other computer readable medium, such as CD (compact disc), DVD (digital video or versatile disc), etc.

The recovery methods, apparatus and systems including a variable period of time to draw down or evacuate a vessel or system of the present invention can be realized as computer-executable instructions in computer-readable media, such as can be associated or incorporated with the memory storage unit 15, and can be provided to and executed by the unit 10 or to other suitable systems or apparatus, according to aspects of the invention. The computer-readable media includes all possible kinds of media in which computer-readable data is stored or included or can include any type of data that can be read by a computer or a processing unit.

The computer-readable media include for example and not limited to storing media, such as magnetic storing media (e.g., ROMs, floppy disks, hard disk, and the like), optical reading media (e.g., CD-ROMs (compact disc-read-only memory), DVDs (digital versatile discs), re-writable versions of the optical discs, and the like), hybrid magnetic optical disks, organic disks, system memory (read-only memory, random access memory), non-volatile memory such as flash memory or any other volatile or non-volatile memory, other semiconductor media, electronic media, electromagnetic media, infrared, and other communication media such as carrier waves (e.g., transmission via the Internet or another computer). Communication media generally embodies computer-readable instructions, data structures, program modules or other data in a modulated signal such as the carrier waves or other transportable mechanism including any information delivery media.

Computer-readable media such as communication media may include wireless media such as radio frequency, infrared microwaves, and wired media such as a wired network. Also, the computer-readable media can store and execute computer-readable codes that are distributed in computers connected via a network. The computer readable medium also includes cooperating or interconnected computer readable media that are in the processing system or are distributed among multiple processing systems that may be local or remote to the processing system. The present invention can include the computer-readable medium having stored thereon a data structure including a plurality of fields containing data representing the techniques and processes of the recovery methods, apparatus and systems including a variable period of time to draw down or evacuate a vessel or system of the present invention.

Continuing with reference to FIG. 5, FIG. 5 is a schematic diagram of various components of the AC recovery unit of FIGS. 1 through 3 with various control, processing and memory components of FIG. 4 to implement recovery methods and systems, according to aspects of the invention. The microprocessor based control board 17b includes the microcontroller/CPU 17 and the memory 17a, to control operations of the unit 10, including implementing recovery systems and methods, according to aspects of the invention.

The memory storage unit 15 and the SD card board 13, such as a secure digital (SD) memory card or cards, and other types of memories that can store information in the absence of a power source such as a compact flash memory (CF), a flash memory using USB, a Memory Stick, or an extreme digital (XD) memory, for example, can communicate software, programs or data with the processor 17 included on the control board 17b, such as through lines or buses 32 and 32a, respectively. Also, the display 18 and the keypad 20 of the control panel 16 communicate with the processor 17 of the control board 17b, such as through a line or bus 30, for performing the functions of the unit 10, including those related to performing a liquid or gas, such as a refrigerant, recovery operation, according to aspects of the invention.

The microprocessor based control board 17b communicates through a line or bus 34 with a microprocessor based relay board 36 for performing the functions of the unit 10, including those related to performing a liquid or gas, such as a refrigerant, recovery operation, according to aspects of the invention. The relay board 36 typically can include a microprocessor and associated memory to control and coordinate various functions of the unit 10 under control of the processor 17. The relay board communicates with the power supply 40 for the unit 10 through a line or bus 38a, with the power in line 11a communicating with the on/off switch 11 for the unit 10.

A circuit breaker 42 senses and controls a current overload in the unit 10 and communicates information of an overload to the relay board 36 through a line or bus 38b. Pressure switch 44 controls a pressure relief valve to release pressure from an internal tank assembly, such as storage tank 27, of the unit 10, if the pressure exceeds a predetermined value and communicates information of a release of pressure to the relay board 36 through a line or bus 38c.

The vacuum pump 14 receives communications to selectively operate from the processor 17 communicated by the relay board 36 through a line or bus 38d for performing the functions of the unit 10, including those related to performing a liquid or gas, such as a refrigerant, recovery operation, according to aspects of the invention. The compressor 12 also receives communications to selectively operate from the processor 17 communicated by the relay board 36 through a line or bus 38e for performing the functions of the unit 10, including those related to performing a liquid or gas, such as a refrigerant, recovery operation, according to aspects of the invention.

A fan 46 receives communications from the relay board 36 through a line or bus 38f to selectively operate to cool the unit 10. Manifold block 48 receives communications through a line or bus 38g to operatively control various components, such as solenoids, check valves and switches, to distribute and control the flow of liquid or gas, such as a refrigerant, within the unit 10.

Pressure sensors 50 monitor pressure of a liquid or gas, such as a refrigerant, within the unit 10 and communicate pressure information thereon through a line or bus 38h to the relay board 36. Temperature sensor 52 monitors the temperature within an internal storage vessel, such as the storage tank 27, of the unit 10 for storing a liquid or gas, such as a refrigerant, and communicates temperature information thereon through a line or bus 38i to the relay board 36. A loadcell assembly 54 measures the amount of refrigerant, liquid or gas being charged or recovered by the unit 10 and communicates information thereon through a line or bus 38j to the relay board 36.

Figure 6:
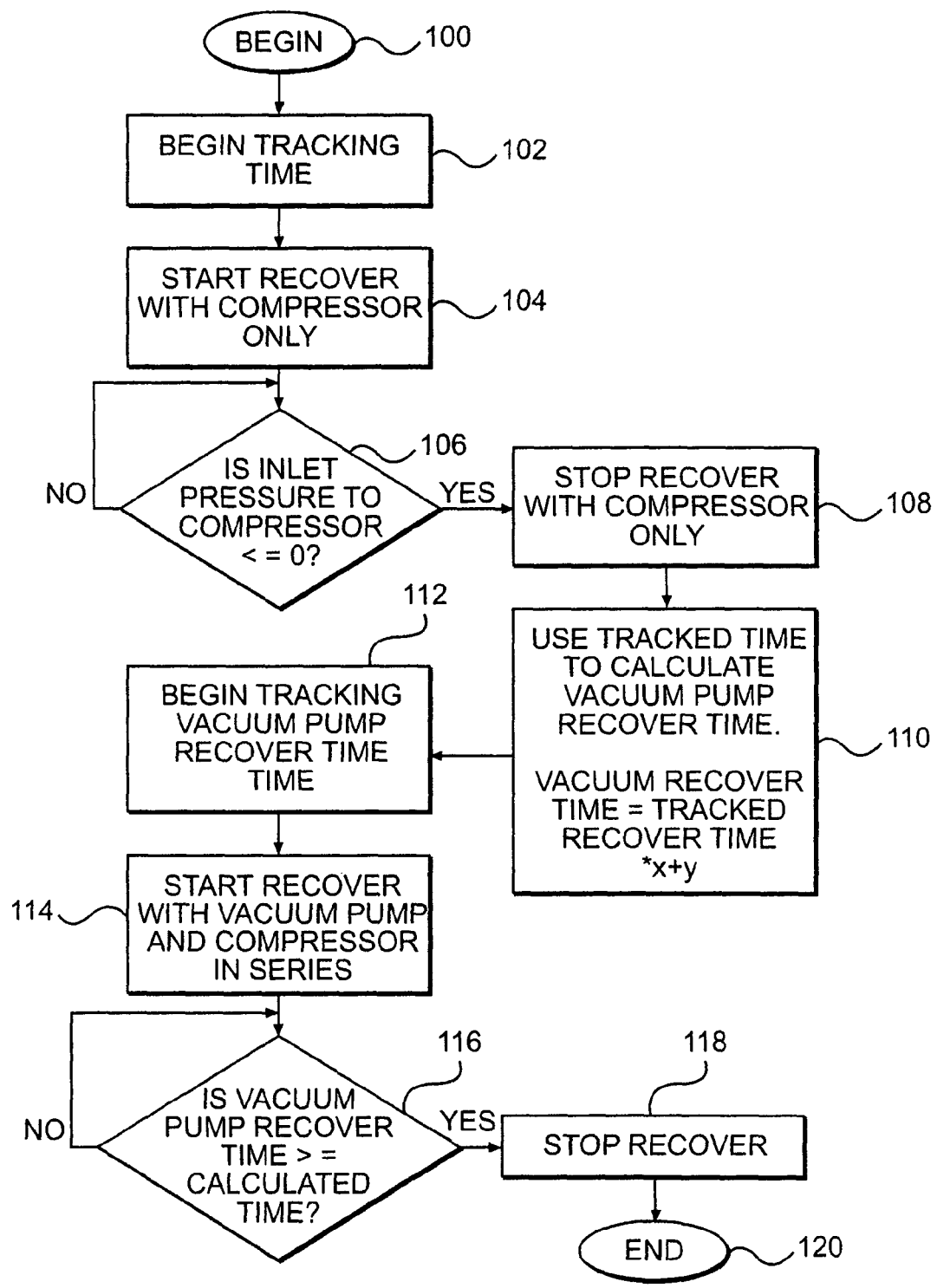
FIG. 6 is a flowchart illustrating steps or operations that can be followed in accordance with an exemplary embodiment of a recovery method, apparatus and system of the present invention.

FIG. 6 is a flowchart illustrating steps or operations that can be followed in accordance with an exemplary embodiment of a recovery method, apparatus and system including a variable period of time to draw down or evacuate a vessel or system of the present invention. The processes and operations of FIG. 6 are described, by way of example, with reference to a recovery operation of refrigerant by the AC recovery unit 10, although the invention is not limited in this regard.

In FIG. 6, the recovery process starts with operation 100, under control of the processor 17 communicating with the memory storage unit 15 and/or with the SD card 13. In operation 100, for example, the unit 10 displays a message on the display 18 to indicate a beginning the recovery operation or to indicate that the recovery operation is in progress, such as where a recovery operation is selected by the menu selection button 22 and associated navigation keys 24, or the recovery operation is selected by the buttons 26 "Automatic" or "Recover," for example. To proceed with a recovery operation, the user can presses the start/yes button 28 and the process proceeds to operation 102, or alternatively, the user can press the stop/no button 29 to indicate a decision to stop or to not proceed with the recovery process.

At operation 102, the processor 17 begins tracking the time it takes for the compressor 12 to pull the refrigerant, gas or liquid, such as vehicle refrigerant, into the on board storage tank 27 to a zero psig system pressure. The process then proceeds to operation 104 where the compressor 12, without the assistance of the vacuum pump 14, starts the first phase or stage of the recovery or evacuation of the system or vessel, such as a vehicle AC system, according to aspects of the invention.

At operation 106, during the recovery process at operation 104, the pressure within the on board storage tank 27 is monitored by one or more of the pressure sensors 50, such as an onboard pressure transducer on the unit 10, during the recovery process. The processor 17 of the unit 10, as a recovery system, receives data from one or more pressure sensors 50 as to the rate of change of the pressure from a normal system pressure for the system or vessel being evacuated to zero psig, for example.

During the evacuation or recovery process at operation 106, the processor 17, based at least on the data received from one or more of the pressure sensors 50, determines whether the inlet pressure to the compressor 12 is less than or equal to zero psig. Where the inlet pressure to the compressor 12 is determined to be greater than zero psig at operation 106, the process continues at operation 104. However, where the inlet pressure to the compressor 12 is determined to be less than or equal to zero psig at operation 106, the process proceeds to operation 108. At operation 108 the first phase or stage of the recovery process of operation 104 ends via the compressor 12 only and the process proceeds to operation 110.

At operation 110, based upon information received from one or more pressure sensors 50 and the tracked time at operation 102 to complete the first stage or phase of the recovery process at operation 104, the processor 17 at operation 110 then determines, or calculates, the time required for the second phase or stage of the required vacuum pump/compressor series run time for the second phase or stage of the recovery process. This determination, or adjustment, of the second phase or stage run time is typically based on historical data for the system or vessel to be evacuated, such as servicing small, medium and large systems under a variety of ambient conditions and system types, for example.

The determination, or calculation, at operation 110 can also take into consideration various factors or variables as large systems with partial charge (typically reducing the time for the second stage or phase) or small systems under cool ambient conditions (typically increasing the time for the second stage or phase). One or more of following factors or variables can also be taken into consideration in determining the variable second phase or stage recovery time to enhance reliability of the recovery process, such as the rate of recovered refrigerant weight, the change ambient temperature, or the vehicle refrigerant capacity, such as stored in a database in the memory storage 15 or the memory 17a or that is communicated to the unit 10.

The determination, or calculation, at operation 110, according to aspects of the invention, provides a relatively shorter service time, by incorporating a variable recovery time for the second phase or stage of the recovery process, while enabling meeting the recovery efficiency requirements, such as the 95% recovery efficiency of the SAE recovery standard for mobile AC systems, for example.

The determination of the variable recovery time at operation 110 is typically based on one or more correlations or functional relationships that can be based upon one or more of the above factors or variables, as well as the size and capacity of the vehicle or vessel being evacuated, according to aspects of the invention. For example, FIG. 7 is a graphical illustration of exemplary correlations of a recovery time to evacuate or draw down during a first recovery phase or stage, such as to zero psig, related to a deep recovery time to additionally evacuate or draw down during a second recovery phase or stage, such as to a 95% refrigerant recovery efficiency of the unit 10, according to aspects of the invention.

In operation 110, an exemplary correlation relation or function is illustrated to determine the variable recovery time for the second stage or phase of the recovery process. The illustrated exemplary correlation relation or function includes a linear correlation relation, namely: $V_r = T_r(x) + y$, where $V_r$ is the variable recovery time for the second stage or phase of the recovery process and $T_r$ is the slope of the linear relation associating the measured tracked recovery time "x" at operation 102 for the first recovery stage or phase of the recovery process in the linear correlation relation to determine the corresponding variable recovery time, $V_r$, with "y" being the y axis intercept for the linear correlation relation.

Figure 7:
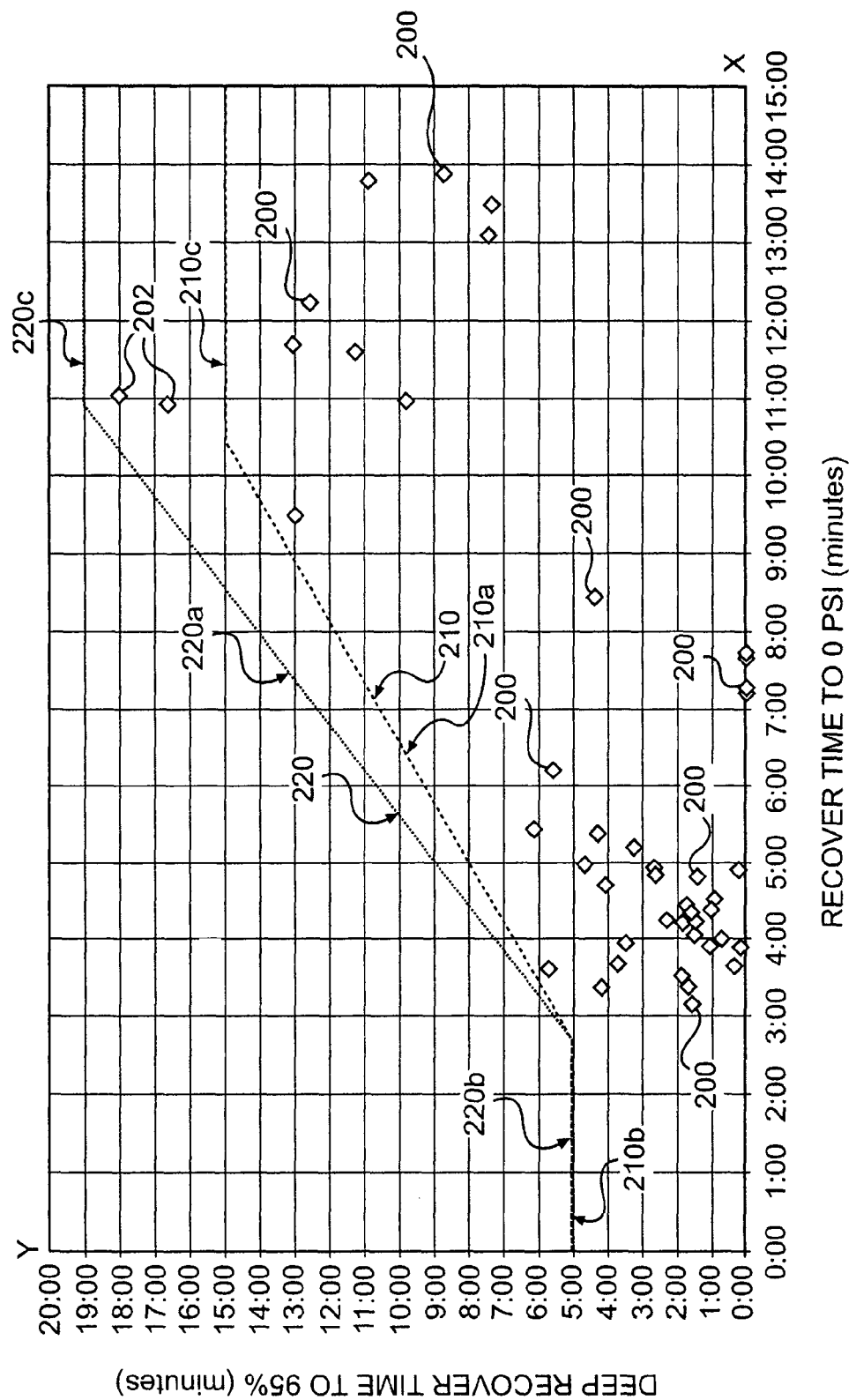
FIG. 7 is a graphical illustration of correlations of a recovery time to evacuate during a first recovery phase to zero psig and during a second recovery phase to a 95% refrigerant recovery efficiency in accordance with exemplary embodiments and aspects of the present invention.

In this regard, FIG. 7 illustrates two exemplary linear correlations relations, 210 and 220, for operation 110 to determine the variable recovery time, according to aspects of the invention, although the invention is not limited in this regard. For example, correlation relations or functions other than linear, such as exponential, parabolic, hyperbolic, or other suitable correlation relations or functions, or combinations thereof, can also be used to determine the variable recovery time $V_r$ for the second stage or phase of the recovery process, depending upon the use or application, according to aspects of the invention.

Where the variable recovery time, $V_r$, has been determined for the second recovery phase or stage at operation 110, the process then proceeds to operation 112. At operation 112, the processor 17 begins tracking the time $T_s$ for the second recovery stage or phase during which time the compressor 12 and the vacuum pump 14 work or operate together, such as in series, to further or additionally pull a gas or liquid, such as vehicle refrigerant, into the on board storage tank 27.

The process then also proceeds to operation 114 where the compressor 12 and the vacuum pump 14 of the unit 10 work or operate together, such as in series, to carry out the second phase or stage of the recovery or evacuation of the system or vessel, such as a vehicle AC system, according to aspects of the invention.

During the second stage or phase of the evacuation or recovery process at operation 114, the process also proceeds to operation 116. At operation 116, the processor 17 determines whether tracked time $T_s$ for the second phase or stage of the recovery process is greater than or equal to the determined variable recovery time, $V_{r_s}$ at operation 110.

Where the tracked time $T_s$ for the second phase or stage of the recovery process is less than the determined variable recovery time, $V_{r_s}$ for the second phase or stage of the recovery process, the second stage or phase of the recovery process continues at operation 114. However, where the tracked time $T_s$ for the second phase or stage of the recovery process is greater than or equal to the determined variable recovery time, $V_{r_s}$ for the second phase or stage of the recovery process, the process proceeds to operation 118. At operation 118 the second phase or stage or the recovery process of operation 114 is stopped or terminates. The process then proceeds to operation 120 and ends.

Referring to FIG. 7, FIG. 7 illustrates a first or primary correlation relation or function 210 and a second or secondary correlation relation or function 220 used to determine a predetermined variable recovery time for the second phase or stage of a refrigerant recovery process, according to aspects of the invention. The correlation relations or functions 210 and 220 of FIG. 7 are typically based at least in part on a test matrix including a plurality of test points 200 and 202, with each test point 200, 202 representing an actual test point, 200, or a theoretical test point, 202, of a recovery process of an AC system.

In the example of FIG. 7, for example, the points 200 represent the recovery time for the first phase or stage or the recovery process as related to the recovery time for the second stage or phase or the recovery process, for AC systems of varied makes and models of cars, although the invention is not limited in this regard. The points 202 are theoretical "worst case" test points for the first stage or phase related to the second stage or phase of the recovery process for a group of AC systems, as measured on and determined from a test stand or set up.

In FIG. 7, the x axis in the test matrix indicates, in minutes, for the test points 200, 202 how long it took for the compressor 12, without the assistance of the vacuum pump 14, during the first phase or stage of the recovery process to reach zero psig, for the corresponding points 200. Where the first stage or phase of the recovery processes reaches zero psig, the compressor 12 and the vacuum pump 14 operate or work together, in series, for the second stage or phase of the recovery process. Also, in FIG. 7, the y axis in the test matrix indicates, in minutes, for the test points 200, 202 how long it took for the compressor 12 and the vacuum pump 14 working or operating together, in series, during the second phase or stage of the recovery process to reach a 95% level of the refrigerant recovered from the AC system, for the corresponding test points 200, 202.

The primary correlation relation 210 in FIG. 7 was developed taking into consideration the points 200 to provide a relation or correlation for the predetermined variable period of time that provides the 95% recovery efficiency level, for the aforementioned groups of varied AC systems for vehicles. The correlation relation, such as the primary correlation relation 210, provides for a relatively shorter reduced time period to accomplish the recovery process over a fixed recovery time process, according to aspects of the invention.

As illustrated in FIG. 7, from the test points 200 on the graph, applying the primary correlation relation or function 210, all of the test points 200 corresponding to refrigerant recovery from the AC systems for the vehicles tested fell below the line formed by the primary correlation relation or function 210 indicating that at least 95% of the refrigerant would be recovered, thus meeting the SAE standard for refrigerant recovery for mobile AC systems, with improved efficiency over a fixed period of time for the recovery process.

The exemplary primary correlation relation or function 210 is a combination of three sub-correlation linear relations or functions, 210a, 210b and 210c, so as to provide a software algorithm, such as is executed by the processor 17 and can be stored in the memory storage 15 or the memory 17. The exemplary primary correlation relation or function 210, for the exemplary group of points 200, of FIG. 7 includes a first sub-correlation linear relation or function 210a, of the form y=mx+b, corresponding to the correlation relation $V_r=T_r(x)+(y)$, where "x" is the tracked recovery time for the first phase or stage of the recovery process and is in a first range from about 2.75 minutes to about 10.5 minutes, and second and third sub-correlation linear relations 210b and 210c of the form y=b respectively corresponding to $V_r$=5 minutes, where "x" is the tracked recovery time for the first phase or stage of the recovery process and is in a second range of less than about 2.75 minutes, and $V_r$=15 minutes, where "x" is the tracked recovery time for the first phase or stage of the recovery process and is in a third range of greater than about 10.5 minutes, to limit the recovery time for the second phase or stage of the recovery process within a range of five minutes to fifteen minutes. In the sub-correlation linear relations or functions, 210a, 210b and 210c, the first, second and third ranges of time for the first recovery time typically cover a total range of the first recovery time for a recovery process, such as for a particular use, application or group of systems or units, for example, according to aspects of the invention.

Such limiting of the recovery time for the second phase or stage of recovery with the three sub-correlation relations or functions 210a, 210b and 210c forming the primary correlation relation or function 210 for the exemplary group of points 200 provides a relatively shorter period of time over a fixed recovery time to achieve the required 95% recovery efficiency, as well as increasing the overall efficiency of the recovery process.

Continuing with reference to FIG. 7 the secondary correlation relation or function 220 was developed taking into consideration the test points 200 and the theoretical "worst case" test points 202 based on relatively extreme tests to provide a relation or correlation for the predetermined variable period of time that provides the 95% recovery efficiency level.

The secondary correlation relation or function 220, while providing for a relatively longer variable recovery time over the variable recovery time provided by the primary correlation relation or function 210, can likewise provide for a relatively shorter reduced time period to accomplish the recovery process over a fixed recovery time process, according to aspects of the invention.

As illustrated in FIG. 7, from the points 200 and 202 on the graph, applying the secondary correlation relation or function 220, all of the test points 200 corresponding to refrigerant recovery from the AC systems for the vehicles tested and the "worst case" test points 202 fell below the line formed by the secondary correlation relation or function 220 indicating that at least 95% of the refrigerant would be recovered, thus meeting the SAE standard, with relatively improved efficiency over a fixed period of time for the recovery process.

The exemplary secondary correlation relation or function 220 is a combination of three sub-correlation linear relations or functions, 220a, 220b and 220c, so as to provide a software algorithm, such as is executed by the processor 17 and can be stored in the memory storage 15 or the memory 17. The exemplary correlation relation or function 220, for the exemplary group of points 200 and 202, of FIG. 7 includes a first sub-correlation linear relation or function 220a, of the form y=mx+b, corresponding to the correlation relation $V_r=T_r(x)+(y)$, where "x" is the tracked recovery time for the first phase or stage of the recovery process and is in a first range from about 2.75 minutes to about 11.0 minutes, and second and third sub-correlation linear relations 220b and 220c of the form y=b respectively corresponding to $V_r$=5 minutes, where "x" is the tracked recovery time for the first phase or stage of the recovery process and is in a second range of less than about 2.75 minutes, and $V_r$=19 minutes, where "x" is the tracked recovery time for the first phase or stage of the recovery process and is in a third range of greater than about 11.0 minutes, to limit the recovery time for the second phase or stage of the recovery process within a range of five minutes to nineteen minutes. In the sub-correlation linear relations or functions, 220a, 220b and 220c, the first, second and third ranges of time for the first recovery time typically cover a total range of the first recovery time for a recovery process, such as for a particular use, application or group of systems or units, for example, according to aspects of the invention.

Such limiting of the recovery time for the second phase or stage of recovery with the three sub-correlation relations or functions 220a, 220b and 220c forming the secondary correlation relation or function 220 for the exemplary group of points 200 and 202 can likewise provide a relatively shorter period of time over a fixed recovery time to achieve the required 95% recovery efficiency, as well as increasing the overall efficiency of the recovery process.

As evident from the foregoing, a plurality of correlations relations and functions, such as the primary and secondary correlation relations or functions 210 and 220, and a plurality of sub-correlation relations or functions, such as the sub-correlation relations or functions 210a, 210b and 210c forming the primary correlation relation or function 210 and the sub-correlation relations or functions 220a, 220b and 220c forming the secondary correlation relation or function 210, can selectively optimize the variable recovery time, for various uses, applications or conditions, according to aspects of the invention.

According to aspects of the invention, apparatus, systems and methods are provided that include, in various embodiments, a determined, predetermined variable period of time for a second stage or phase of a gas or liquid, such as a refrigerant, recovery process, such as based upon one or more correlation relations or functions. Such variable recovery time, according to aspects of the invention, provides for reducing operating costs and increasing efficiency as to number of units, vessels or systems that can be serviced over a period of time, such as to meet the SAE requirement for refrigerant recovery efficiency for mobile AC systems.

Although examples of the recovery systems, apparatus and methods of the present invention including a variable recovery time for a second stage or phase of a gas or liquid, such as a refrigerant, recovery process have been shown and described in relation to an AC recovery unit, it will be appreciated that the recovery systems, apparatus and methods including the variable recovery time, according to aspects of the invention, can also be applied to other items, such as where reducing operating costs and increasing efficiency as to number of units, vessels or systems that can be evacuated over a period of time can be important, such as for industrial or medical devices or systems, such as for various types of gas or liquid containment systems, units or vessels, for example. Also, although the recovery system, apparatus and methods are useful to promote efficiency or reduce costs in the automotive industry, such as for AC recovery units, the present invention can also be used to do other things and/or used in other industries.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A recovery apparatus, comprising: a compressor to evacuate a gas or liquid from a vessel or system during a first phase and a second phase of a recovery process; a vacuum pump to evacuate the gas or liquid from the vessel or system during the second phase of the recovery process; and a processor to selectively control the compressor and the vacuum pump to evacuate the gas or liquid from the vessel or system, wherein: the processor controls the compressor to operate to evacuate the vessel or system to a first predetermined level during the first phase of the recovery process and determines a first recovery time to evacuate the vessel or system to the first predetermined level, the processor determines a variable second recovery time for the second phase of the recovery process to evacuate the vessel or system from the first predetermined level to a second predetermined level by applying in one or more correlation relations the first recovery time to evacuate the vessel or system to the first predetermined level, and the processor controls the compressor to operate together with the vacuum pump for the variable second recovery time to evacuate the vessel or system to the second predetermined level during the second phase of the recovery process.

2. The recovery apparatus of claim 1, wherein the recovery apparatus is a mobile air conditioning (AC) recovery unit and the vessel or system is an AC system of a vehicle.

3. The recovery apparatus of claim 2, wherein the one or more correlation relations comprise a linear relation of the form $V_r=T_r(x)+(y)$, and wherein:
   $V_r$ is the variable recovery time for the second phase of the recovery process,
   $T_r$ is slope of the linear relation associating the first recovery time (x) for the first phase of the recovery process with the corresponding variable recovery time $V_r$, and with the y axis intercept of the linear relation being (y).

4. The recovery apparatus of claim 1, wherein the one or more correlation relations comprise a linear relation of the form $V_r=T_r(x)+(y)$, and wherein:
   $V_r$ is the variable recovery time for the second phase of the recovery process,
   $T_r$ is slope of the linear relation associating the first recovery time (x) for the first phase of the recovery process with the corresponding variable recovery time $V_r$, and with the y axis intercept of the linear relation being (y).

5. The recovery apparatus of claim 1, wherein the one or more correlation relations comprise a linear correlation function including a plurality of sub-correlation linear relations, including:
   a first sub-correlation linear relation of the form $V_r=T_r(x)+(y)$, wherein $V_r$ is the variable recovery time for the second phase of the recovery process, $T_r$ is slope of the first sub-correlation linear relation associating the first recovery time (x) for the first phase of the recovery process with the corresponding variable recovery time $V_r$, and with the y axis intercept of the first sub-correlation linear relation being (y), where the first recovery time (x) is in a first range of time, a second sub-correlation linear relation of the form $V_r=y1$, with y1 being the y axis intercept of the second sub-correlation linear relation, where the first recovery time (x) is in a second range of time, and a third sub-correlation linear relation of the form $V_r=y2$, with y2 being the y axis intercept of the third sub-correlation linear relation, where the first recovery time (x) is in a third range of time.

6. The recovery apparatus of claim 5, wherein the recovery apparatus is a mobile air conditioning (AC) recovery unit and the vessel or system is an AC system of a vehicle.

7. The recovery apparatus of claim 5, wherein the second range of time precedes the first range of time and the third range of time follows the first range of time, with the first, second and third ranges of time comprising a total range of the first recovery time for the recovery process.

8. The recovery apparatus of claim 7, wherein the recovery apparatus is a mobile air conditioning (AC) recovery unit and the vessel or system is an AC system of a vehicle.

9. The recovery apparatus of claim 1, further comprising:
a memory to store the one or more correlation relations to determine the variable recovery time for the second phase of the recovery process to evacuate the vessel or system to the second predetermined level related to the first recovery time to evacuate the vessel or system to the first predetermined level.

10. A mobile air conditioning (AC) recovery system, comprising: a compressor to evacuate a refrigerant from a vehicle AC system during a first phase and a second phase of a refrigerant recovery process; a vacuum pump to evacuate the refrigerant from the vehicle AC system during the second phase of the refrigerant recovery process; a memory to store one or more correlation relations to determine a variable second recovery time for the second phase of the refrigerant recovery process to evacuate the refrigerant from the vehicle AC system to a second predetermined level related to a first recovery time to evacuate the refrigerant from the vehicle AC system to a first predetermined level during the first phase of the refrigerant recovery process; and a processor to selectively control the compressor and the vacuum pump to evacuate the refrigerant from the vehicle AC system to the first and second predetermined levels, wherein: the processor controls the compressor to operate to evacuate the refrigerant from the vehicle AC system to the first predetermined level during the first phase of the refrigerant recovery process and determines the first recovery time to evacuate the refrigerant from the vehicle AC system to the first predetermined level, the processor determines the variable second recovery time for the second phase of the recovery process to evacuate the refrigerant from the vehicle AC system from the first predetermined level to the second predetermined level by applying in the one or more correlation relations the first recovery time to evacuate the refrigerant from the vehicle AC system to the first predetermined level, and the processor controls the compressor to operate together with the vacuum pump for the variable second recovery time to evacuate the refrigerant from the vehicle AC system to the second predetermined level during the second phase of the refrigerant recovery process.

11. The mobile air conditioning (AC) recovery system of claim 10, wherein the one or more correlation relations comprise a linear relation of the form $V_r=T_r(x)+(y)$, and wherein:
$V_r$ is variable recovery time for the second phase of the recovery process, $T_r$ is slope of the linear relation associating the first recovery time (x) for the first phase of the recovery process with the corresponding variable recovery time $V_r$, and with the y axis intercept of the linear relation being (y).

12. The mobile air conditioning (AC) recovery system of claim 11, wherein:
the first predetermined level is about zero psig, and
the second predetermined level is about 95 percent (%) recovery of the refrigerant from the vehicle AC system.

13. The mobile air conditioning (AC) recovery system of claim 10, wherein:
the first predetermined level is about zero psig, and
the second predetermined level is about 95 percent (%) recovery of the refrigerant from the vehicle AC system.

14. The mobile air conditioning (AC) recovery system of claim 10, wherein the one or more correlation relations comprise a linear correlation function including a plurality of sub-correlation linear relations, including:
a first sub-correlation linear relation of the form $V_r=T_r(x)+(y)$, wherein $V_r$ is the variable recovery time for the second phase of the recovery process, $T_r$ is slope of the first sub-correlation linear relation associating the first recovery time (x) for the first phase of the recovery process with the corresponding variable recovery time $V_r$, and with the y axis intercept of the first sub-correlation linear relation being (y), where the first recovery time (x) is in a first range of time, a second sub-correlation linear relation of the form $V_r=y1$, with y1 being the y axis intercept of the second sub-correlation linear relation, where the first recovery time (x) is in a second range of time, and a third sub-correlation linear relation of the form $V_r=y2$, with y2 being the y axis intercept of the third sub-correlation linear relation, where the first recovery time (x) is in a third range of time.

15. The mobile air conditioning (AC) recovery system of claim 14, wherein:
the first predetermined level is about zero psig, and
the second predetermined level is about 95 percent (%) recovery of the refrigerant from the vehicle AC system.

16. The mobile air conditioning (AC) recovery system of claim 14, wherein the second range of time precedes the first range of time and the third range of time follows the first range of time, with the first, second and third ranges of time comprising a total range of the first recovery time for the refrigerant recovery process.

17. A recovery system, comprising:
a first means for evacuating a gas or liquid from a vessel or system during a first phase and a second phase of a recovery process;
a second means for evacuating the gas or liquid from the vessel or system during the second phase of the recovery process; and
a control means for selectively controlling the first means and the second means for evacuating the gas or liquid from the vessel or system, wherein:
the control means controls the first means for evacuating to evacuate the vessel or system to a first predetermined level during the first phase of the recovery process and determines a first recovery time to evacuate the vessel or system to the first predetermined level,
the control means determines a variable second recovery time for the second phase of the recovery process to evacuate the vessel or system from the first predetermined level to a second predetermined level by applying in one or more correlation relations the first recovery time to evacuate the vessel or system to the first predetermined level, and the control means controls the first means for evacuating to operate together with the second means for evacuating for the variable recovery second time to evacuate the vessel or system to the second predetermined level during the second phase of the recovery process.

18. The recovery system of claim 17, wherein the recovery system is a mobile air conditioning (AC) recovery unit and the vessel or system is an AC system of a vehicle.

19. The recovery system of claim 17, wherein the one or more correlation relations comprise a linear relation of the form $V_r=T_r(x)+(y)$, and wherein:

$V_r$ is the variable recovery time for the second phase of the recovery process, $T_r$ is slope of the linear relation associating the first recovery time (x) for the first phase of the recovery process with the corresponding variable recovery time $V_r$, and with the y axis intercept of the linear relation being (y).

20. The recovery system of claim 17, wherein the one or more correlation relations comprise a linear correlation function including a plurality of sub-correlation linear relations, including:

a first sub-correlation linear relation of the form $V_r=T_r(x)+(y)$, wherein $V_r$ is the variable recovery time for the second phase of the recovery process, $T_r$ is slope of the first sub-correlation linear relation associating the first recovery time (x) for the first phase of the recovery process with the corresponding variable recovery time $V_r$, and with the y axis intercept of the first sub-correlation linear relation being (y), where the first recovery time (x) is in a first range of time, a second sub-correlation linear relation of the form $V_r=y1$, with y1 being the y axis intercept of the second sub-correlation linear relation, where the first recovery time (x) is in a second range of time, and a third sub-correlation linear relation of the form $V_r=y2$, with y2 being the y axis intercept of the third sub-correlation linear relation, where the first recovery time (x) is in a third range of time.

21. The recovery system of claim 20, wherein the second range of time precedes the first range of time and the third range of time follows the first range of time, with the first, second and third ranges of time comprising a total range of the first recovery time for the recovery process.

22. The recovery system of claim 17, further comprising:

a means for storing the one or more correlation relations to determine the variable recovery time for the second phase of the recovery process to evacuate the vessel or system to the second predetermined level related to the first recovery time to evacuate the vessel or system to the first predetermined level.

23. A recovery method, comprising: monitoring the evacuation of gas or liquid from a vessel or system with a processor during a first phase of a recovery process to a first predetermined level; using the processor to determine a first recovery time to evacuate the vessel or system to the first predetermined level during the first phase of the recovery process; using the processor to determine a variable second recovery time for a second phase of the recovery process to evacuate the vessel or system from the first predetermined level to a second predetermined level by applying in one or more correlation relations the first recovery time to evacuate the vessel or system to the first predetermined level; using the processor to control the evacuation of the gas or liquid from the vessel or system for the variable second recovery time during the second phase of the recovery process to evacuate the gas or liquid from the vessel or system to the second predetermined level; using the processor to control the evacuation of the gas or liquid from the vessel or system to the first predetermined level by operation of a compressor during the first phase of the recovery process; and using the processor to control the evacuation of the gas or liquid from the vessel or system to the second predetermined level by operation of the compressor together with a vacuum pump for the variable recovery time during the second phase of the recovery process.

24. The recovery method of claim 23, wherein:

the vessel or system comprises an air conditioning (AC) system of a vehicle, the first predetermined level is about zero psig, and the second predetermined level is about 95 percent (%) recovery of the refrigerant from the AC system of the vehicle.

25. The recovery method of claim 24, wherein the one or more correlation relations comprise a linear relation of the form $V_r=T_r(x)+(y)$, and wherein:

$V_r$ is the variable recovery time for the second phase of the recovery process, $T_r$ is slope of the linear relation associating the first recovery time (x) for the first phase of the recovery process with the corresponding variable recovery time $V_r$, and with the y axis intercept of the linear relation being (y).

26. A tangible computer readable medium having embodied thereon computer-executable instructions for execution of a gas or liquid recovery method by a processor, the method comprising: evacuating gas or liquid from a vessel or system during a first phase of a recovery process to a first predetermined level; determining a first recovery time to evacuate the vessel or system to the first predetermined level during the first phase of the recovery process; determining a variable second recovery time for a second phase of the recovery process to evacuate the vessel or system from the first predetermined level to a second predetermined level by applying in one or more correlation relations the first recovery time to evacuate the vessel or system to the first predetermined level; evacuating the gas or liquid from the vessel or system for the variable second recovery time during the second phase of the recovery process to evacuate the gas or liquid from the vessel or system to the second predetermined level; evacuating the gas or liquid from the vessel or system to the first predetermined level by operation of a compressor during the first phase of the recovery process; and evacuating the gas or liquid from the vessel or system to the second predetermined level by operation of the compressor together with a vacuum pump for the variable recovery time during the second phase of the recovery process.

27. The tangible computer readable medium of claim 26, wherein the method embodied thereon in the computer-executable instructions further comprises:

evacuating the gas or liquid from the vessel or system to about zero psig as the first predetermined level; and evacuating the gas or liquid from the vessel or system to about 95 percent (%) recovery of the gas or liquid as the second predetermined level.

28. The recovery apparatus of claim 1, further comprising a sensor configured to measure pressure at an inlet of the compressor and communicate signals indicating the measurements to the processor, wherein the processor is configured to determine when the first predetermined level is reached based on the signals.

* * * * *